(12) United States Patent
Domin et al.

(10) Patent No.: US 7,976,065 B2
(45) Date of Patent: Jul. 12, 2011

(54) STEERING COLUMN ATTACHMENT ASSEMBLY

(75) Inventors: Ronald J. Domin, Huron, OH (US); Rocco Piccolomini, Elyria, OH (US)

(73) Assignee: Flaming River Industries, Inc., Berea, OH (US)

( * ) Notice: Subject to any disclaimer, the term of this patent is extended or adjusted under 35 U.S.C. 154(b) by 542 days.

(21) Appl. No.: 12/180,592

(22) Filed: Jul. 28, 2008

(65) Prior Publication Data

US 2010/0019480 A1    Jan. 28, 2010

(51) Int. Cl.
B62D 1/16    (2006.01)
(52) U.S. Cl. .................................................. 280/779
(58) Field of Classification Search .............. 280/750, 280/779, 780; 403/194–197, 203, 220–227, 403/232.1, 290, 344, 399; 248/230.8; 74/492
See application file for complete search history.

(56) References Cited

U.S. PATENT DOCUMENTS

| 4,452,096 A | * | 6/1984 | Workman | 74/492 |
| 4,517,854 A | * | 5/1985 | Kawabata et al. | 74/492 |
| 4,884,778 A | * | 12/1989 | Yamamoto | 248/548 |
| 6,260,883 B1 | * | 7/2001 | Shimizu et al. | 280/779 |
| 2002/0117842 A1 | * | 8/2002 | Takano et al. | 280/779 |

* cited by examiner

Primary Examiner — Paul N Dickson
Assistant Examiner — Robert A Coker
(74) Attorney, Agent, or Firm — Tarolli, Sundheim, Covell & Tummino LLP

(57) ABSTRACT

A steering column attachment assembly is disclosed for adjustably locating and securing after market steering columns to an automotive vehicle. The attachment assembly comprises a penannular flexible insert having inner and outer portions. The outer portion of the flexible insert comprises a plurality of sides. The attachment assembly also comprises a strap clamp having inner and outer regions and an opening provided to the inner region for receiving the flexible insert. The inner region and outer region are formed from a plurality of sides corresponding to the plurality of sides of the outer portion of the flexible insert such that the plurality of sides of the flexible insert and corresponding plurality of sides of the inner region of the strap clamp are in contact during assembly. The strap clamp features a plurality of adjustable compression members that engage the flexible insert.

20 Claims, 5 Drawing Sheets

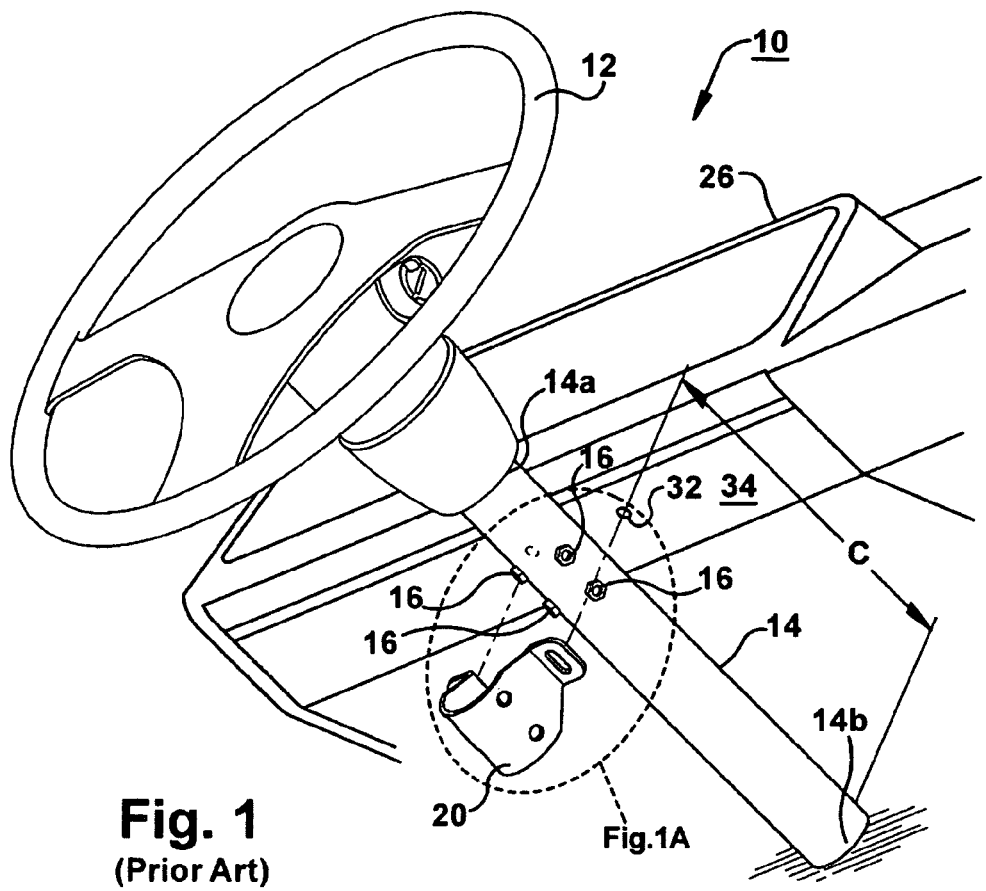
Fig. 1
(Prior Art)
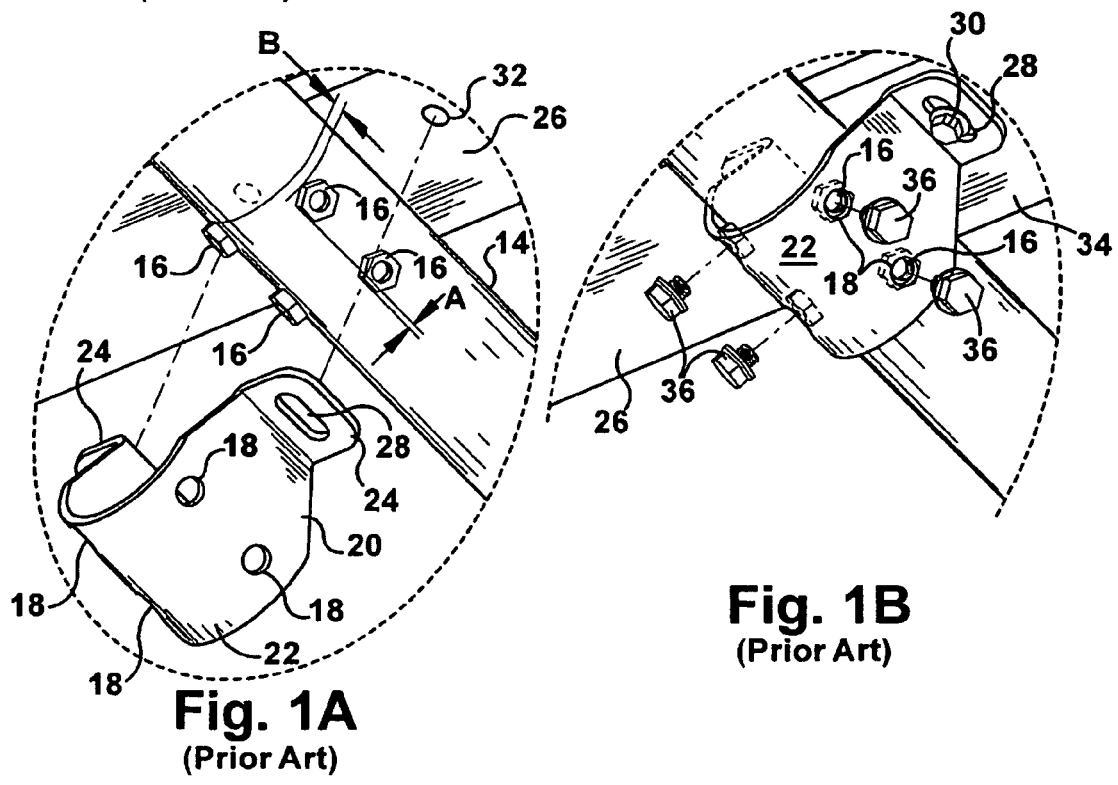
Fig. 1A
(Prior Art)
Fig. 1B
(Prior Art)

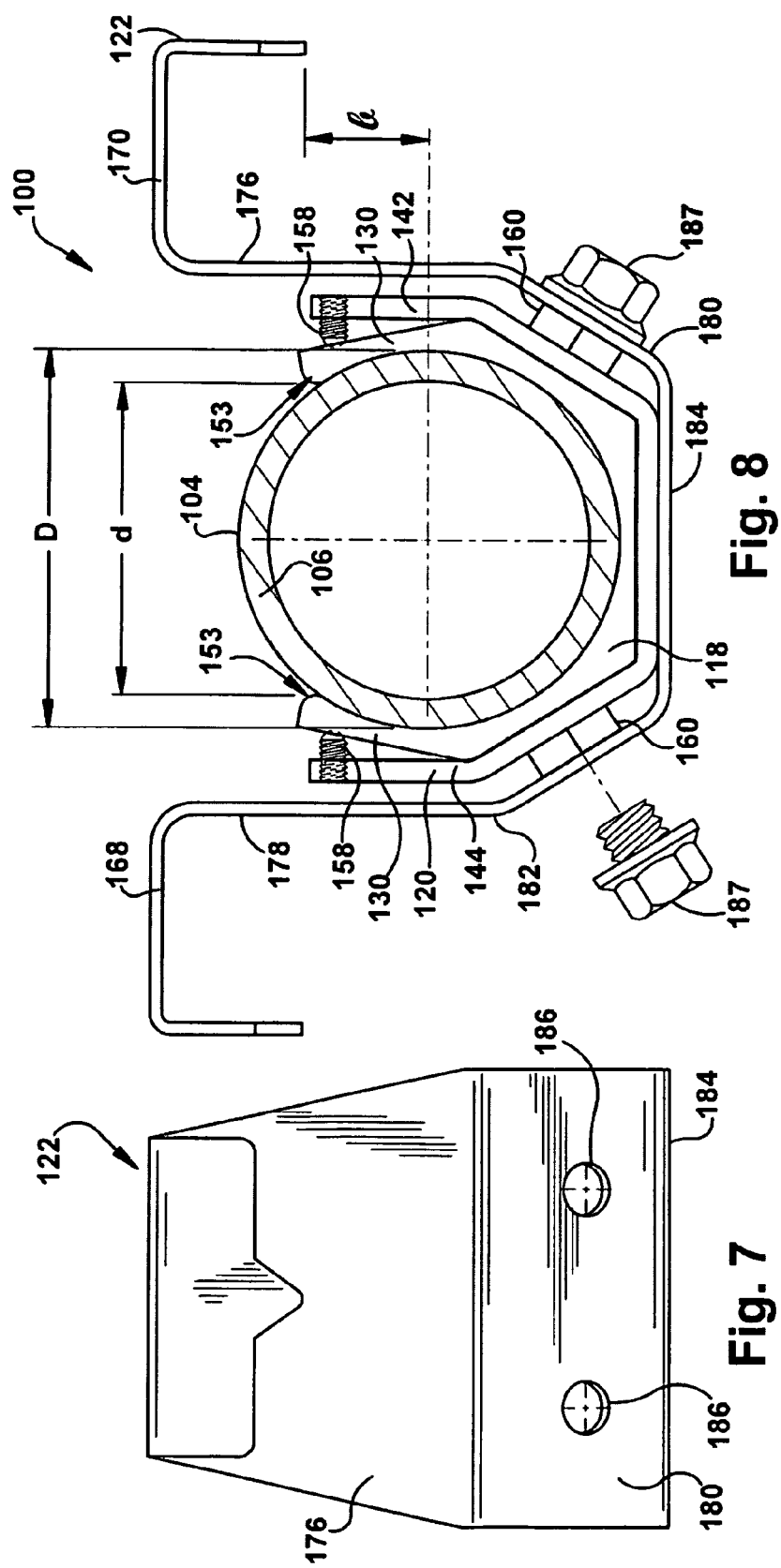

STEERING COLUMN ATTACHMENT ASSEMBLY

TECHNICAL FIELD

The present invention relates to a steering column attachment assembly and a method of use, and more specifically, a steering column attachment assembly for securing and adjustably locating a steering column to a dashboard assembly of an automotive vehicle.

BACKGROUND

Restoration and customizing of antique automobiles has become a growing hobby, and as result, created an entire automotive component industry focused on making original equipment ("OE") replacement parts and improved aftermarket parts. An increased interest in hot rodding relatively newer cars by replacing original equipment manufacturer ("OEM") parts with higher performance alternatives has also contributed to this burgeoning automotive component industry.

Replacement parts, whether styled after the OEM parts or improved versions are made for all major areas of the automobile, including for example, engine components, chassis components, interior cabin parts, steering assemblies, suspension kits, drive-train assemblies, frame and body parts. Reasons for replacement of various automotive components are not just to improve performance or to return the car to original condition by replacing worn or broken parts, but replacement also occurs for aesthetic reasons, including the appearance of replacement parts. Replacement parts can offer a new shape or be made from or covered in a new type of material such as stainless steel or chrome that might be preferred by the car owner over the OEM equipment.

The steering assemblies include steering components such as a steering column, steering gear box, rack and pinion, power steering pump and linkage parts such as tie rods and universal joints, all of which are often of interest for replacement by restorers and hot rodders of automobiles. The steering assemblies on many older vehicles may have relatively poor performance compared to modern designs. Owners of such older vehicles or hot rodders seeking to improve steering performance may replace OEM or aftermarket equipment with better performing or more reliable assemblies. Alternatively, the appearance of new steering assembly components can justify replacement by some enthusiasts.

SUMMARY

One example embodiment of the present disclosure includes a steering column attachment assembly for adjustably locating and securing after market steering columns to an automotive vehicle. The attachment assembly comprises a penannular flexible insert having inner and outer portions. The inner portion is contoured to the geometry of a steering column and includes an opening for receiving the steering column and the outer portion of the flexible insert comprising a plurality of sides. The attachment assembly further comprises a strap clamp having inner and outer regions and an opening provided to the inner region for receiving the penannular flexible insert. The inner region and outer region are formed from a plurality of sides corresponding to the plurality of sides of the outer portion of the flexible insert such that the plurality of sides of the flexible insert and corresponding plurality of sides of the inner region of the strap clamp are in contact during assembly. The strap clamp yet further comprises first and second upper region sides in the inner and outer region and a plurality of adjustable compression members adjustably located in the first and second upper sides to engage with the flexible insert. Spaced first and second radius ends extend along the flexible insert opening that compress and lock the steering column attachment assembly to the column when the compression members engage the flexible insert.

Another example embodiment of the present disclosure includes a steering column attachment assembly for adjustably locating and securing steering columns to an automotive vehicle. The attachment assembly comprises a penannular flexible insert having inner and outer portions. The inner portion is contoured to the geometry of a steering column, having an opening for receiving the steering column and the outer portion of the flexible insert comprising a plurality of sides. The attachment assembly further comprises a strap clamp having inner and outer regions and an opening provided to the inner region for receiving the penannular flexible insert. The inner region and outer region are formed from a plurality of sides corresponding to the plurality of sides of the outer portion of the flexible insert such that the plurality of sides of the flexible insert and corresponding plurality of sides in the inner region of the strap clamp are in contact during assembly. The strap clamp yet further comprises first and second upper region sides in the inner and outer region and a plurality of adjustable compression members for adjustably locating in the first and second upper region sides to engage with the flexible insert. Spaced first and second radius ends extend along the flexible insert opening that compress and lock the steering column attachment assembly to the column when the compression members engage the flexible insert. The attachment assembly further comprises a securing bracket that is positioned over the strap clamp for securing the strap clamp to the automotive vehicle. The securing bracket comprises first and second lower faces with attachment apertures for connecting corresponding fasteners to corresponding threaded connections located in first and second lower region sides located in the outer region plurality of sides of the strap clamp.

A further example embodiment of the present disclosure includes an attachment assembly for adjustably locating and securing a steering column to an underside of an automotive vehicle dashboard. The attachment assembly comprises a penannular flexible insert for protecting the column to be attached from scratching and adjustably locating and securing the column to the automotive vehicle having inner and outer portions. The inner portion is contoured to the outer geometry of a steering column and includes an opening for receiving the steering column. The outer portion of the flexible insert comprises first and second upper portion sides connected to respective first and second lower portion sides, and a bottom portion side connecting the first lower portion to the second lower portion. The attachment assembly further comprises a strap clamp featuring inner and outer regions and an opening provided to the inner region for receiving the penannular flexible insert. The inner region and outer region are formed from first and second upper region sides connected to respective first and second lower region sides, and a bottom region side connecting the first lower region side to the second lower region side. The first and second lower inner region and bottom inner region sides of the strap clamp are in contact during assembly with the first and second lower portion and bottom portion sides of the outer portion of the flexible insert, respectively. The strap clamp further comprises through the first and second upper region sides a plurality of tapped apertures for receiving adjustable compression members to engage with the first and second upper portion sides of flexible insert. Spaced first and second radius ends extending along the flexible insert opening compress and lock the steering column attachment assembly to the column when the compression members engage the flexible insert. The attachment assembly yet further comprises a securing bracket that is positioned over the strap clamp for securing the strap clamp to the automotive vehicle. The securing bracket features first and second lower faces with attachment apertures for connecting corresponding fasteners to corresponding threaded connections located in the first and second lower region sides in the outer region of the strap clamp.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts throughout the drawings unless otherwise noted and in which:

FIG. 1 is a perspective exploded view of a typical steering column of the prior art illustrating welded lugs located along the shaft of the steering column;

FIG. 1A is a magnified view of a portion of the perspective view of FIG. 1;

FIG. 1B is a magnified assembled view of FIG. 1A;

FIG. 7 is an elevated view of a securing bracket constructed in accordance with one embodiment of the present disclosure; and FIG. 8 is an end view of FIG. 5.

DETAILED DESCRIPTION

Figures 2, 3:
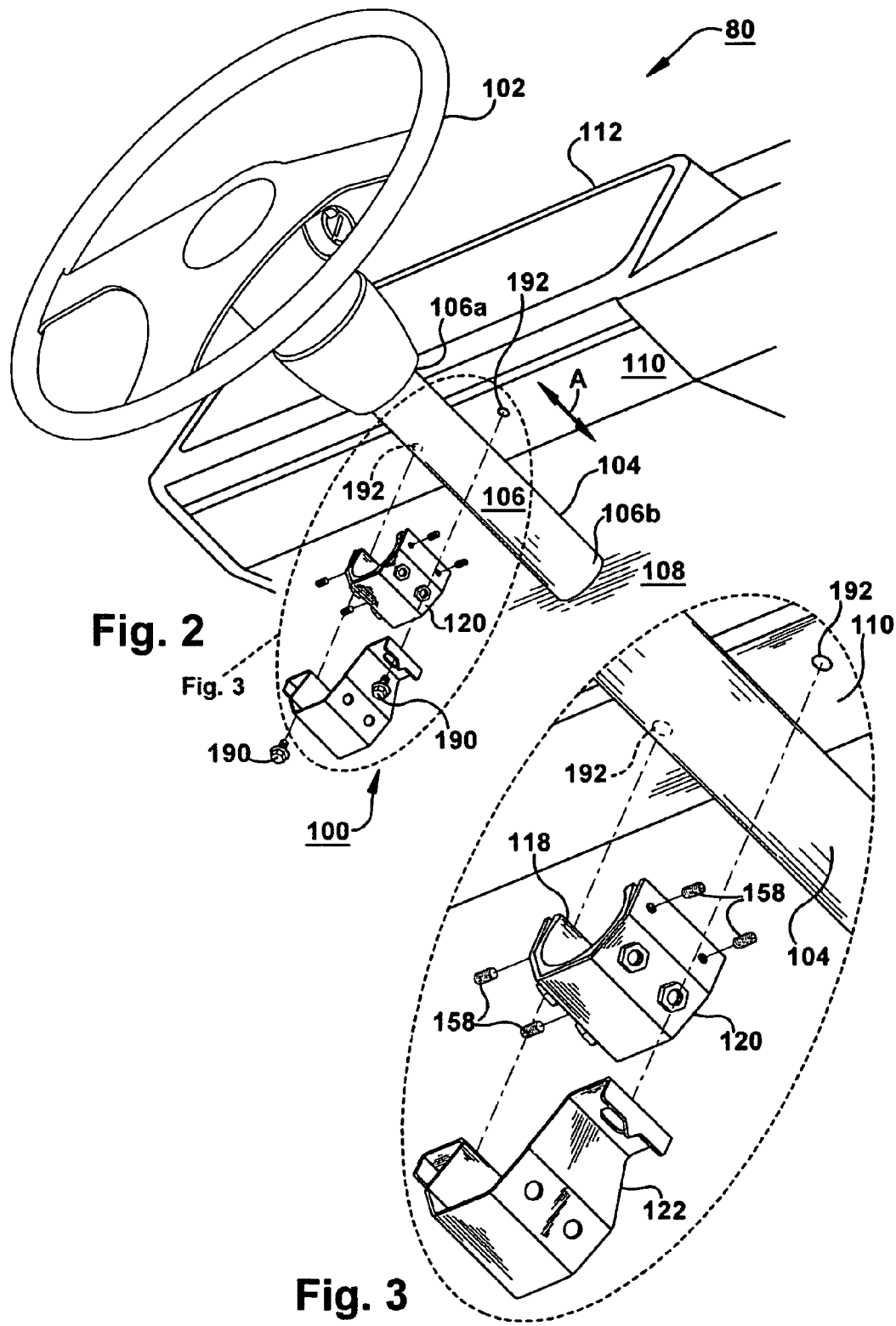
FIG. 2 is an exploded isometric view of a steering column attachment assembly constructed in accordance with one example embodiment of the present disclosure.
FIG. 3 is a magnified view of a portion of FIG. 2.

The present invention relates to a steering column attachment assembly and a method of use, and more specifically, a steering column attachment assembly for securing and adjustably locating a steering column to a dashboard assembly of an automotive vehicle.

The steering column attachment assembly of the present invention provides inter alia, versatility during installation of aftermarket or generic steering columns as well adjustability features that allow the location of the steering columns to be uniquely located to a desired position suitable to the owner or driver of the automotive vehicle.

Conventional OEM steering columns are secured to a vehicle dashboard using a number of lugs welded along the shaft of the column and attached by a mounting bracket, as illustrated by the steering assembly 10 in FIG. 1. The steering assembly 10 of the prior art includes a steering wheel 12 attached to a column 14 at a first end 14a and a second end 14b that passes through the vehicle fire wall to a steering gear assembly (not shown). The steering column 14 typically includes four (4) pre-welded threaded lugs 16 that are received by corresponding apertures 18 in mounting bracket 20, as best seen in FIG. 1A.

The mounting bracket 20 typically includes a main arcuate body 22 that surrounds the column 14 and a pair of supporting flanges 24 at the ends of the body for attaching the mounting bracket and steering column to a dashboard 26 of the vehicle. During assembly, the mounting bracket 20 is positioned such that the lugs 16 align with the apertures 18 for receiving an attachment bolt 36, as best seen in FIG. 1B. A slot 28 is located in each respective support flange 24 for securing the mounting bracket and column 14 to the dashboard 26 via a respected mounting bolt 30 and threaded receiving hole 32 on the underside 34 of the dashboard 26. The slots 28 allow for flexibility in positioning the bracket 20 based on the fixed location of the column controlled by the location of the lugs 16 and receiving holes 32. Respective holding bolts 36 are fastened to each respective lug 16, passing partially through and securing the mounting bracket 20 into the assembled position of FIG. 1B.

The typical OEM steering assembly 10 and illustrated method of attachment provides numerous shortcomings, including misaligned locations between lugs 16 illustrated for example by dimensions A and B in FIG. 1A or variance in location from a datum illustrated by dimension C in FIG. 1. The misalignment or variance in location is typically a result of relaxed tolerances during manufacturing or poor quality. As a result, when steering columns 14 are removed and replaced with new or different columns, the lugs on the new or replacement column may not align with the bracket 20 or allow the bracket to align with receiving holes 32. Such shortcomings are resolved by the novel construct and design of the steering column attachment assembly of the present disclosure.

Referring now FIG. 2 is an exploded isometric view of a steering column assembly 80 secured by a steering column attachment assembly 100 constructed in accordance with one example embodiment of the present disclosure. The steering column assembly 80 includes a steering wheel 102 attached to a column 104 comprising a cylindrical shaft 106 having a first end 106a attached to the steering wheel and a second end 106b that passes through the vehicle fire wall or floor panel 108 to a steering gear assembly (not shown). The steering column 104 in the illustrated embodiment is secured by the steering column attachment assembly 100 to an underside 110 of a dashboard 112. The steering column 104 is typically a cylindrical shaft 106 having approximately a two-inch diameter.

The steering column attachment assembly 100 of the present disclosure attaches about the cylindrical shaft 106 of the column 104 as illustrated in FIGS. 2 and 3, but could equally secure any geometrical shape or diameter column without departing from the spirit and scope of the claimed invention. In addition, the illustrated embodiment of FIGS. 2-3 depict the column 104 being attached to the under side 110 of the dashboard 112, but could equally secure the column to any number of securing fixtures provided by the OEM other than dashboards used in automotive vehicles.

Figure 6:
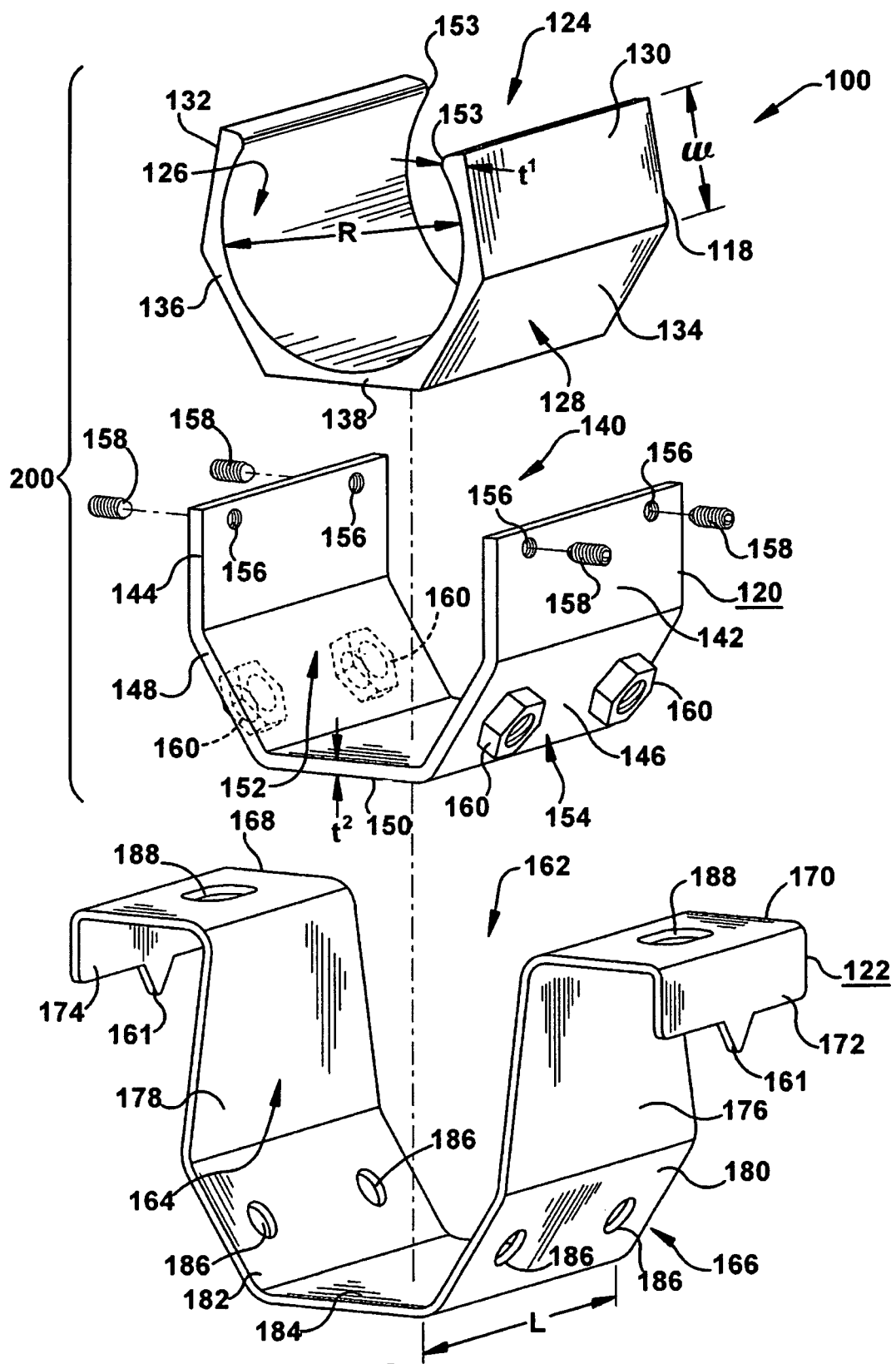
FIG. 6 is an exploded perspective view of a steering column attachment assembly constructed in accordance to another embodiment of the present disclosure.

The steering column attachment assembly 100 comprises a penannular flexible insert 118, a strap clamp 120, and securing bracket 122, as best seen in FIGS. 6-8. The flexible insert 118 can be made from an elastomeric or polymeric material, and in the illustrated embodiment, the flexible material is ethylene propylene diene monomer ("EPDM"). The penannular flexible insert 118 includes an opening 124, an inner portion 126, and outer portion 128. The inner portion comprises a dimension ("R"), slightly larger than the outer dimension of the column 104, and in the illustrated embodiment FIGS. 2-3, the inner portion is slightly larger than the diameter of the cylindrical shaft 106 of the column.

The outer portion 128 and strap clamp 120 comprise a five-sided pentagon. The outer portion 128 includes upper sides 130, 132, lower sides 134, 136 and bottom 138 that are received in inner opening 140 of the strap clamp 120 in corresponding upper sides 142, 144, lower sides 146, 148, and bottom 150, respectively. The outer portion 128 of the flexible insert 118 and corresponding sides and bottom are slightly smaller to allow for a slip-fit insertion of the flexible insert into an inner region 152 of the strap clamp as best illustrated in FIG. 3. The upper sides 130, 132 comprise radius ends 153 of increased thickness ("t1") that extend the length of the opening 124 for gripping the column 104.

The strap clamp 120 in the illustrated example embodiment of FIG. 2 is made from steel and includes an outer region 154. Located along the upper sides 142, 144 are four (4) threaded or tapped holes 156 for receiving fasteners 158. In the illustrated embodiment of FIG. 6, fasteners 158 are ¼-28×⅜ inch long socket head (cup-point) set screws and the strap clamp is made from approximately 3/16 of an inch thick steel ("t2"). Attached to the lower sides 146, 148 of the strap clamp 120 are four (4) lugs 160 substantially symmetrically located about each lower side and with respect to each lower sides. In the illustrated embodiment of FIG. 6, the lugs 160 are threaded to receive a 5/16-18 threaded fastener. Additionally, the flexible insert 118, strap clamp 120, and bracket 122 are all of approximately same length ("L"), and in the illustrated embodiment of FIG. 6 the length L is approximately four (4) inches. Each side and bottom in the illustrated embodiment is approximately two (2) inches in width ("w").

The securing bracket 122 is similarly constructed as the OEM mounting bracket 20. In fact, the flexible insert 118 and strap clamp 120 are designed to be received by most OEM mounting brackets. In an alternative embodiment, the steering column attachment assembly 100 comprises only the flexible insert 118 and strap clamp 120, using an OEM mounting bracket to attach the steering column attachment assembly to the dashboard 112 or equivalent fixture. The securing bracket 122 of the illustrated embodiment comprises tangs 161 for securing dashboard 112 material or foam for aesthetic purposes.

Figure 5:
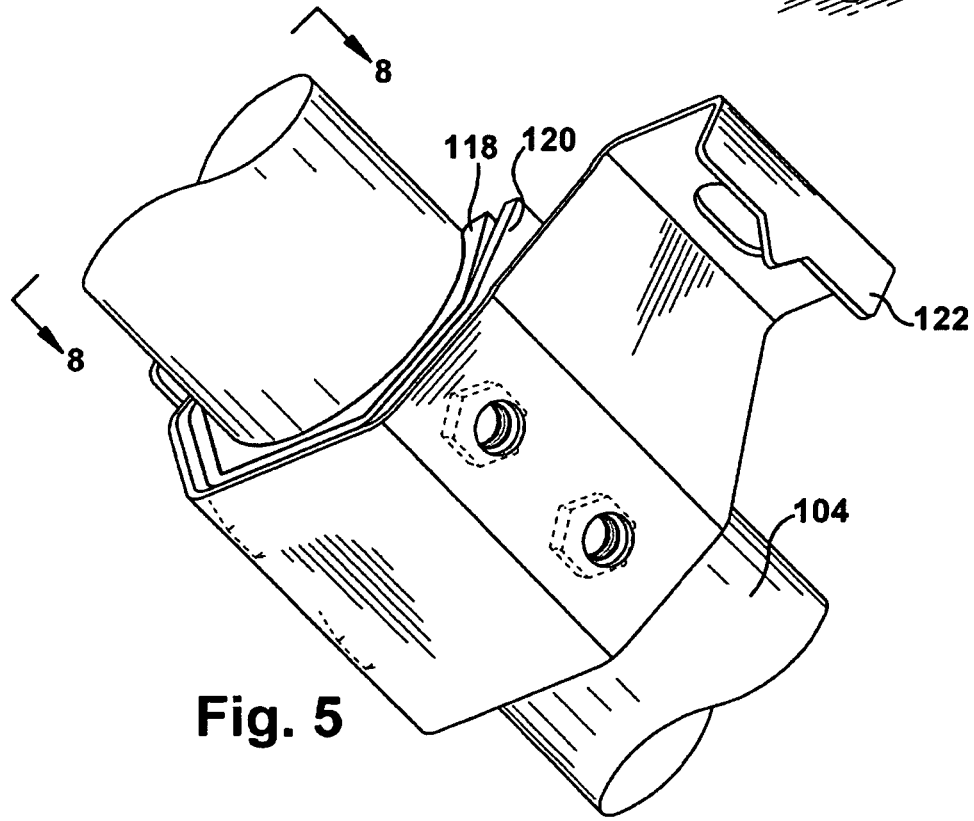
FIG. 5 is a sectioned perspective view of a steering column attachment assembly secured to a steering column assembly.

In the illustrated embodiment of FIG. 3, the securing bracket 122 is shown, attaching the strap clamp 120 and insert 118 to the underside 110 of the dashboard 112, but could equally be attached by an OEM bracket without departing from the spirit and scope of the claimed invention. FIG. 7 is a side elevation view of the securing bracket 122 constructed in accordance with one embodiment of the present disclosure. FIG. 8 is a cross sectional end view of FIG. 5, illustrating the interconnecting relationship between the flexible insert 118, strap clamp 120, and securing bracket 122 once assembled.

The securing bracket 122 comprises an opening 162, an inner area 164, outer area 166, securing flanges 168, 170, outer ends 172, 174, upper sides 176, 178, lower sides 180, 182, and bottom 184. The securing bracket 122 in the illustrated example embodiment is made from is made from approximately 0.13 inches thick or 10 gauge steel and lower sides 180, 182 and bottom 184 are slightly larger than corresponding lower sides 146, 148 and bottom 150 of the strap clamp 120 to allow for a slip-fit insertion into the securing bracket as best illustrated in FIG. 8. Located in lower sides 180, 182 are fastening apertures 186 that are drill-through openings for receiving the body of corresponding fasteners 187 that pass through and thread into the strap clamp 120, attaching the securing bracket 122 to the strap clamp. In the illustrated embodiment of FIG. 3, the fasteners 187 are ⅜ inch bolts. The securing flange 168 and 170 include slots 188 for attaching the securing bracket 122 to the dashboard 112 by fasteners 190 in dash threaded fastener openings 192.

The steering column attachment assembly 100 allows any generic column to be secured to a dashboard 112 of an automotive vehicle without worry of tolerances or lack thereof in pre-welded lugs. The strap clamp 120 further advantageously allows the column to be axially adjusted (see arrows A in FIG. 2) such that the location of the steering wheel 102 is at a desired location for the owner of the automotive vehicle. This is because the strap clamp 120 (unlike welded lugs on the steering column) can move up and down the column without restraint until the column is positioned in its desired location.

Figure 4:
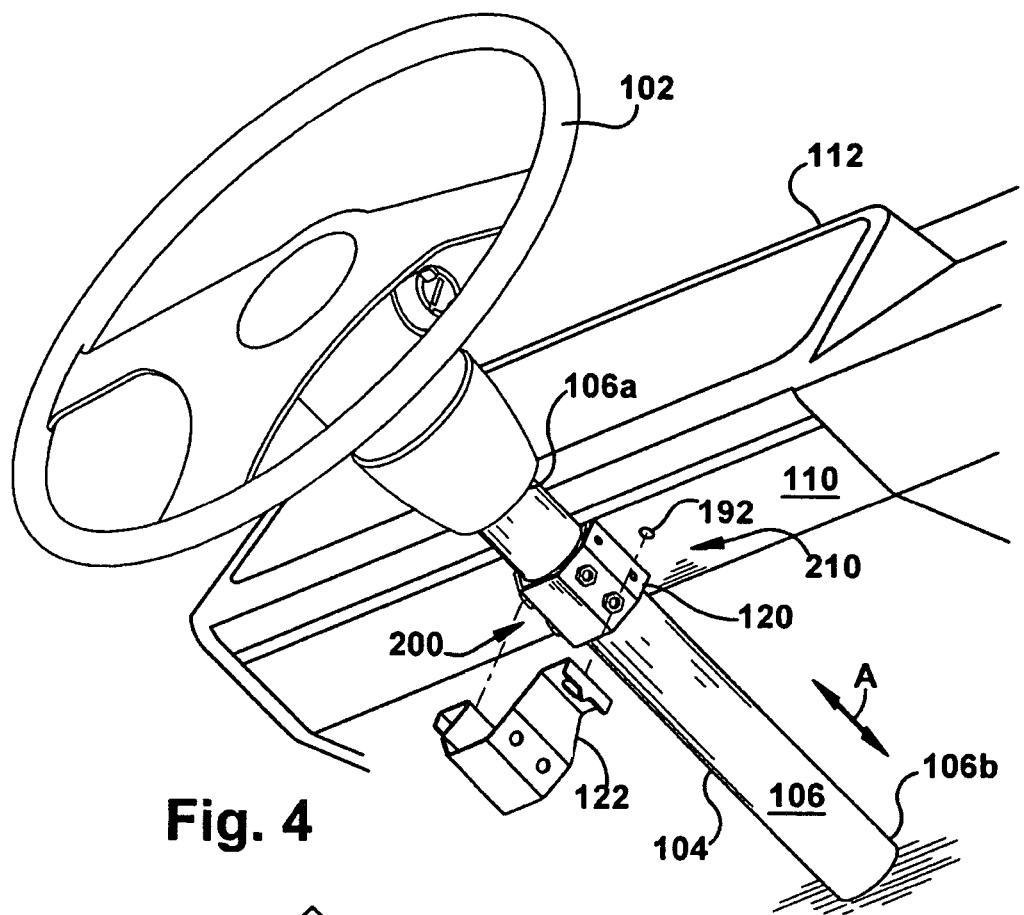
FIG. 4 is an exploded isometric view of a steering column attachment assembly secured to a steering column assembly.

During installation, the flexible insert 118 is inserted into the inner opening 140 of the strap clamp 120 such that the respective lower sides and bottom are in contact with each other forming a moveable assembly 200. The opening 124 of the flexible insert 118 and coupled strap clamp 120 of the moveable assembly 200 are inserted over the steering column 104, as illustrated in FIG. 4, wherein the flexible insert and strap clamp encapsulate more than half the steering column represented by dimension ("h") illustrated in FIG. 8. At this point of the installation, the moveable assembly 200 can move up and down (see arrows A in FIG. 4) the steering column 104 until the column is in the desired location of the automobile vehicle owner. When the steering column 104 is in its desired location, the moveable assembly 200 is positioned in a final location 210 such that the fastening apertures 186 of the securing bracket 122 align with the lugs 160, allowing the fasteners 187 to connect with the lugs and the securing slots 188 to align with dash fastener openings 192 for the connecting of fasteners 190.

When the final location 210 shown in FIG. 3 is determined, the fasteners 158 are inserted and tightened, drawing the flexible insert 118 and its radius ends 153 to lock the moveable assembly 200 into the final location along the column 104. The radius ends 153 advantageously engulf and compress against the column 104 when the fasteners 158 are tightened, forming a locking distance ("d"<) smaller than the overall diameter ("D") (see FIG. 8) of the column. The final location 210 is further secured to the column 104 by the pentagonal shape of both the flexible insert 118 and strap clamp 120 by upper sides 130, 132 and 142, 144, respectively and fasteners 158 as illustrated in FIG. 8.

Once the moveable assembly 200 is secured into the final location 210, the securing bracket 122 or OEM mounting bracket is inserted over the moveable assembly such that the fastening apertures 186 align with respective lugs 160. The securing bracket 122 or OEM mounting bracket is then attached to the dash 112 by inserting fasteners 190 through the respective securing slots 188 into dash threaded fastener openings 190, thereby holding the steering column assembly 80 into a fixed location. Fasteners 187 are then used to further secure the moveable assembly 200 to the OEM mounting bracket or securing bracket 122 as shown in FIG. 8.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A steering column attachment assembly for adjustably locating and securing after market steering columns to an automotive vehicle comprising:
- a penannular flexible insert comprising inner and outer portions, the inner portion contoured to the geometry of a steering column and having an opening for receiving the steering column and the outer portion of said flexible insert comprising a plurality of sides;
- a strap clamp comprising inner and outer regions and an opening provided to said inner region for receiving said penannular flexible insert, said inner region and outer region are formed from a plurality of sides corresponding to the plurality of sides of the outer portion of the flexible insert such that the plurality of sides of the flexible insert and corresponding plurality of sides in the inner region of said strap clamp are in contact during assembly, said strap clamp yet further comprising first and second upper region sides in said inner and outer region and a plurality of adjustable compression members for adjustably locating in said first and second upper sides to engage with said flexible insert; and
- spaced first and second radius ends extending along said flexible insert opening that compress and lock said steering column attachment assembly to the column when said compression members engage said flexible insert.

2. The steering column attachment assembly of claim 1 wherein said plurality of sides of said inner and outer region of the strap clamp further comprises first and second lower region sides, each lower region side comprising a plurality of threaded connections.

3. The steering column attachment assembly of claim 2 further comprising a securing bracket that is positioned over said strap clamp for securing the strap clamp to the automotive vehicle, the securing bracket having first and second lower faces with attachment apertures that align during assembly with said thread connections of said first and second lower region sides.

4. The steering column attachment assembly of claim 1 wherein said compressing members are threaded fasteners.

5. The steering column attachment assembly of claim 1 wherein said plurality of sides of said outer portion comprise two lower portion sides and a bottom portion side connecting the two lower portion sides and wherein said plurality of sides of said inner region and outer regions comprise two lower region sides and a bottom region side connecting the two lower region sides.

6. The steering column attachment assembly of claim 1 further comprising first and second upper portion sides in said flexible insert wherein the said two upper portion sides and two upper region sides compress and lock said steering column attachment assembly to said column when said compression members engage said flexible insert.

7. The steering column attachment assembly of claim 1 wherein said spaced first and second radius ends form a compressed opening when said compression members engage said flexible insert such that the size of the compressed opening between first and second radius ends is smaller than the diameter of the column to be secured by the steering column attachment assembly.

8. The steering column attachment assembly of claim 1 wherein said insert is made from ethylene propylene diene monomer and said strap clamp is made from metal.

9. A steering column attachment assembly for adjustably locating and securing steering columns to an automotive vehicle comprising:
- a penannular flexible insert comprising inner and outer portions, the inner portion contoured to the geometry of a steering column and having an opening for receiving the steering column and the outer portion of said flexible insert comprising a plurality of sides;
- a strap clamp comprising inner and outer regions and an opening provided to said inner region for receiving said penannular flexible insert, said inner region and outer region are formed from a plurality of sides corresponding to the plurality of sides of the outer portion of the flexible insert such that the plurality of sides of the flexible insert and corresponding plurality of sides in the inner region of said strap clamp are in contact during assembly, said strap clamp yet further comprising first and second upper region sides in said inner and outer region and a plurality of adjustable compression members for adjustably locating in said first and second upper region sides to engage with said flexible insert;
- spaced first and second radius ends extending along said flexible insert opening that compress and lock said steering column attachment assembly to the column when said compression members engage said flexible insert; and
- a securing bracket that is positioned over said strap clamp for securing the strap clamp to the automotive vehicle, the securing bracket having first and second lower faces with attachment apertures for connecting corresponding fasteners to corresponding threaded connections located in first and second lower region sides located in said outer region plurality of sides of said strap clamp.

10. The steering column attachment assembly of claim 9 wherein said compressing members are threaded fasteners.

11. The steering column attachment assembly of claim 9 wherein the said flexible insert further comprises two upper portion sides that with said two upper region sides compress and lock said steering column attachment assembly to said column when said compression members engage said flexible insert.

12. The steering column attachment assembly of claim 9 wherein said plurality of sides of said outer portion of said flexible insert comprises first and second lower portion sides and a bottom portion side connecting the two lower portion sides and wherein said plurality of sides of said inner and outer regions comprise said first and second lower region sides and a bottom region side connecting the two lower region sides.

13. The steering column attachment assembly of claim 12 wherein the said two upper portion sides and two upper region sides compress and lock said steering column attachment assembly to said column when said compression members engage said flexible insert.

14. The steering column attachment assembly of claim 9 wherein said spaced first and second radius ends form a compressed opening when said compression members engage said flexible insert such that the size of the compressed opening between first and second radius ends is smaller than the diameter of the column to be secured by the steering column attachment assembly.

15. The steering column attachment assembly of claim 9 wherein said insert is made from ethylene propylene diene monomer and said strap clamp is made from metal.

16. An attachment assembly for adjustably locating and securing a steering column to an underside of an automotive vehicle dashboard, the attachment assembly comprising:
- a penannular flexible insert for protecting the column to be attached from scratching and adjustably locating and securing the column to the automotive vehicle comprising inner and outer portions, the inner portion contoured to the geometry of a steering column and having an opening for receiving the steering column and the outer portion of said flexible insert comprising first and second upper portion sides connected to respective first and second lower portion sides, and a bottom portion side connecting said first lower portion to said second lower portion;

a strap clamp comprising inner and outer regions and an opening provided to said inner region for receiving said penannular flexible insert, said inner region and outer region are formed from first and second upper region sides connected to respective first and second lower region sides, and a bottom region side connecting said first lower region side to said second lower region side, said first and second lower and bottom inner region sides of said strap clamp are in contact during assembly with said first and second lower portion and bottom portion sides of said outer portion of said flexible insert, respectively, said strap clamp further comprising through said first and second upper region sides a plurality of tapped apertures for receiving adjustable compression members to engage with said first and second upper portion sides of flexible insert;

spaced first and second radius ends extending along said flexible insert opening that compress and lock said steering column attachment assembly to the column when said compression members engage said flexible insert; and a securing bracket that is positioned over said strap clamp for securing the strap clamp to the automotive vehicle, the securing bracket having first and second lower faces with attachment apertures for connecting corresponding fasteners to corresponding threaded connections located in said first and second lower region sides in said outer region of said strap clamp.

17. The steering column attachment assembly of claim 16 wherein said compressing members are threaded fasteners.

18. The steering column attachment assembly of claim 16 wherein said insert is made from ethylene propylene diene monomer and said strap clamp and securing bracket are made from metal.

19. The steering column attachment assembly of claim 16 wherein said spaced first and second radius ends form a compressed opening when said compression members engage said flexible insert such that the size of the compressed opening between first and second radius ends is smaller than the diameter of the column to be secured by the steering column attachment assembly.

20. The steering column attachment assembly of claim 16 wherein the said two upper portion sides and two upper region sides compress and lock said steering column attachment assembly to said column when said compression members engage said flexible insert.

* * * * *